United States Patent [19]

Enoki et al.

[11] Patent Number: 4,995,437
[45] Date of Patent: Feb. 26, 1991

[54] HEAVY DUTY PNEUMATIC RADIAL TIRES INCLUDING A BENT GROOVE IN THE SIDE FACE OF THE TREAD

[75] Inventors: Yasutaka Enoki, Sayama; Shigeo Makino, Tokorozawa; Shinji Murase, Kodaira, all of Japan

[73] Assignee: Bridgestone Corporation, Tokyo, Japan

[21] Appl. No.: 275,999

[22] Filed: Nov. 25, 1988

[30] Foreign Application Priority Data

Nov. 25, 1987 [JP] Japan ................................. 62-298036
Oct. 21, 1988 [JP] Japan ................................. 63-266903

[51] Int. Cl.$^5$ ...................... B60C 11/00; B60C 13/02
[52] U.S. Cl. .................................. 152/209 R; 152/523
[58] Field of Search ................ 152/523, 209 R, 209 D

[56] References Cited

U.S. PATENT DOCUMENTS

| | | | |
|---|---|---|---|
| 3,024,825 | 3/1962 | Kutsmichel | 152/209 R |
| 3,253,635 | 5/1966 | Travers | 152/523 |
| 3,482,616 | 12/1969 | French | 152/523 |
| 3,498,354 | 3/1970 | Boileau | 152/209 R |
| 4,265,287 | 5/1981 | Abe et al. | 152/209 R |
| 4,281,702 | 8/1981 | Grosch et al. | 152/523 |

FOREIGN PATENT DOCUMENTS

| | | |
|---|---|---|
| 1480934 | 2/1969 | Fed. Rep. of Germany . |
| 1480933 | 4/1969 | Fed. Rep. of Germany . |
| 2028735 | 3/1980 | United Kingdom . |

*Primary Examiner*—Michael W. Ball
*Assistant Examiner*—Geoffrey L. Knable
*Attorney, Agent, or Firm*—Sughrue, Mion, Zinn, Macpeak & Seas

[57] ABSTRACT

The uneven wear produced in the tread side rib in the heavy duty pneumatic radial tire is prevented by arranging a peripheral fine groove on a particular region of the side face of the tread portion in a particular form.

18 Claims, 4 Drawing Sheets

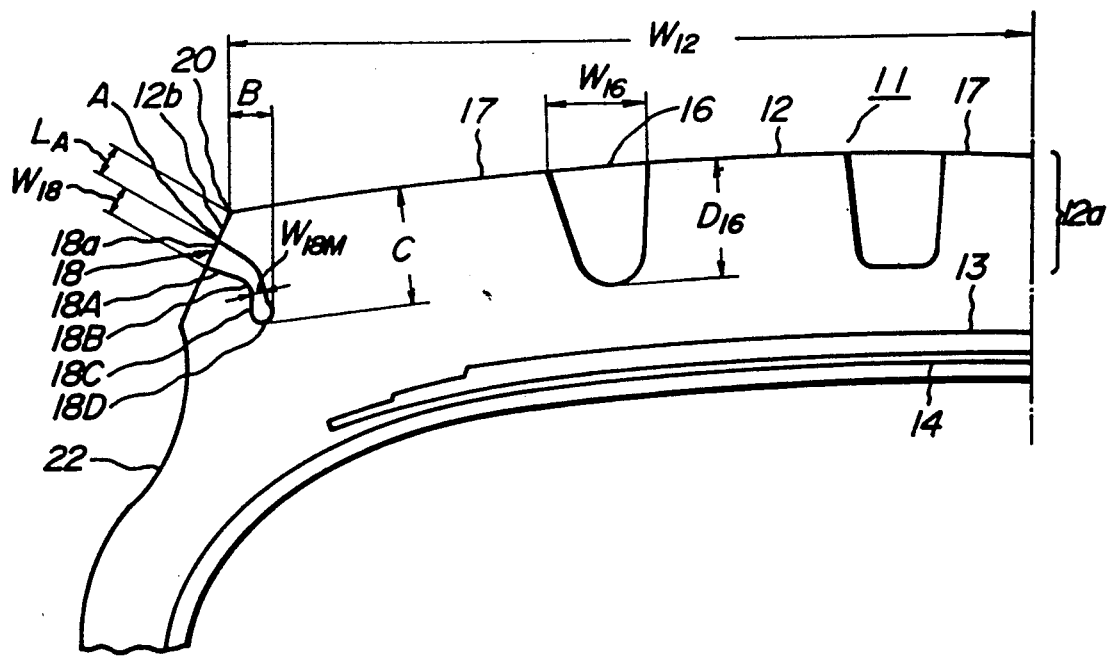
FIG_1
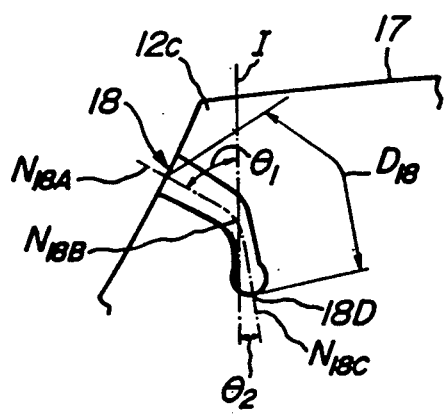
FIG_2

FIG_3
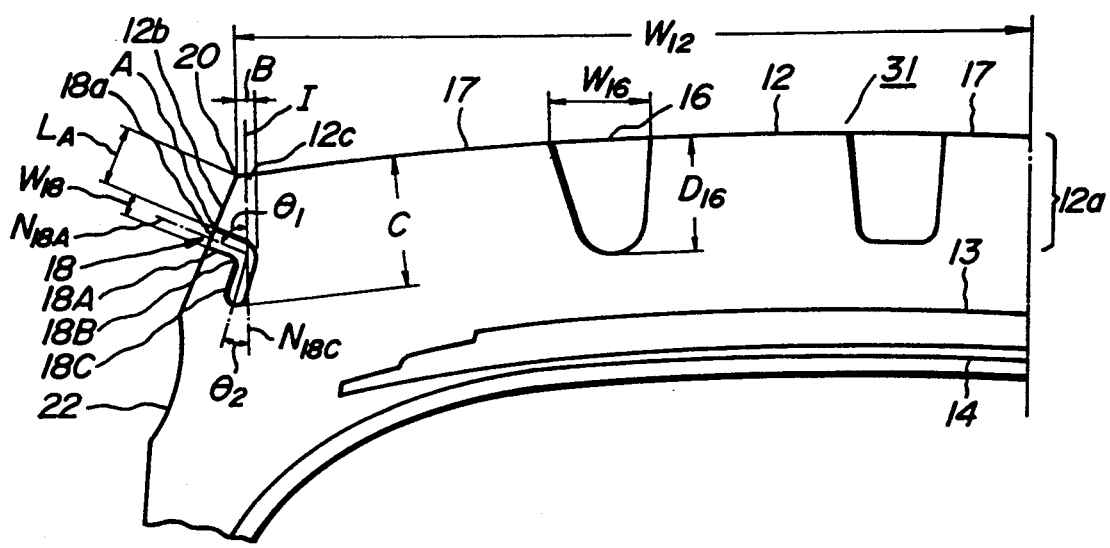

FIG_4
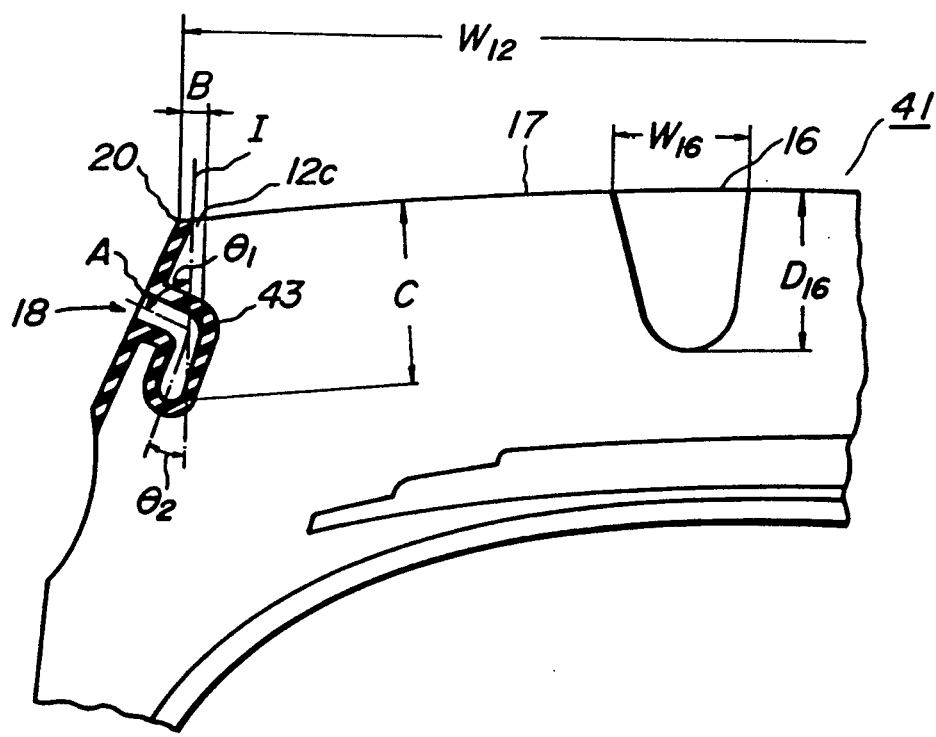
FIG_5
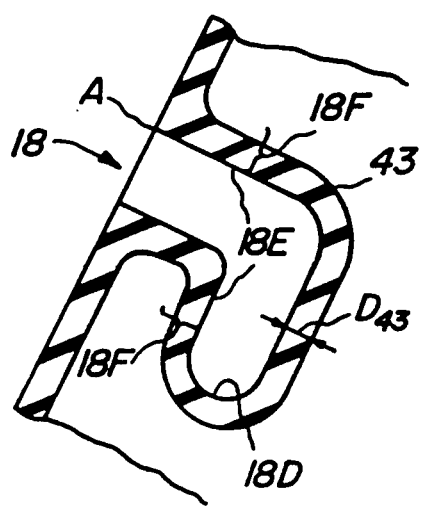

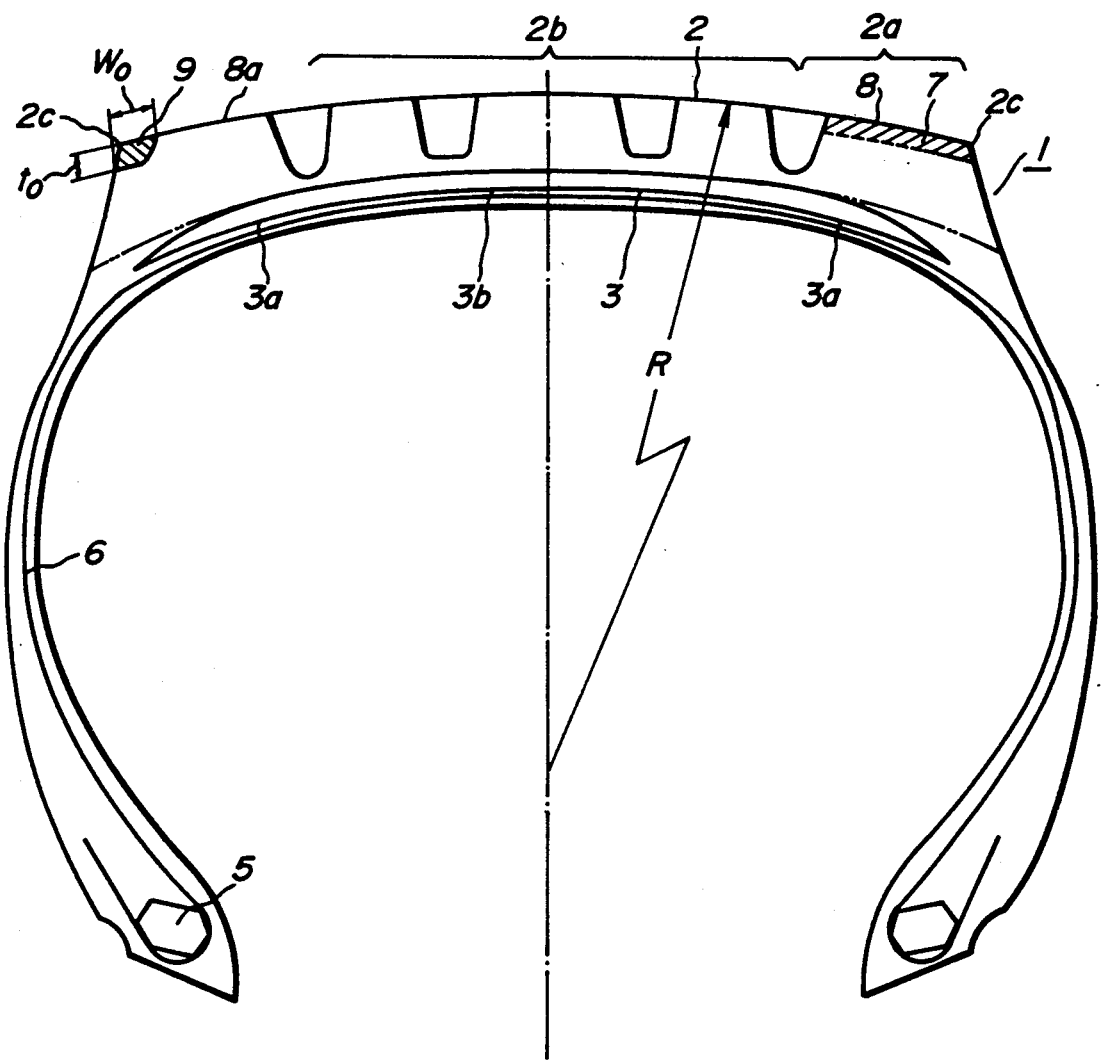
FIG_6
PRIOR ART

HEAVY DUTY PNEUMATIC RADIAL TIRES INCLUDING A BENT GROOVE IN THE SIDE FACE OF THE TREAD

BACKGROUND OF THE INVENTION

1. Field of the Invention

This invention relates to heavy duty pneumatic radial tires, and more particularly to a heavy duty pneumatic radial tire which effectively prevents the occurrence of uneven wear at shoulder ribs in a tread of the tire.

2. Related Art Statement

A the conventional heavy duty pneumatic radial tire, is for example shown in FIG. 6. Such a heavy duty pneumatic radial tire 1 comprises a tread 2 contacting the ground, a belt 3 composed of plural belt layers containing steel cords therein for the reinforcement of the tread 2, and a carcass 6 located inside the belt 3 and extending between a pair of bead cores 5.

In the tread 2 of the heavy duty pneumatic radial tire 1, both end portions 3a of the belt 3 reinforce both shoulder portions 2a of the tread 2, while the central portion 3b of the belt 3 reinforces the central portion 2b of the tread 2. However, the rigidity of the shoulder portion 2a in the tread 2 is smaller than that of the central portion 2b. Furthermore, there is a dragging phenomenon based on the difference in the size between the central portion 2b and the shoulder portion 2a in the tread 2. Therefore, as shown in FIG. 6, the shoulder portion 2a of the tread 2 is prematurely worn to generate a stepwisely uneven wear or a so-called shoulder wear. In some occasions, the outer surface of the shoulder portion 2a in the tread 2 is wavily worn in the circumferential direction (not shown), which propagates toward the central portion of the tread to generate the uneven wear called as a wavy wear.

In order to prevent the occurrence of these uneven wear types there are proposed the increase of the rigidity in the island part 8 of the shoulder portion 2a of the tread 2, the enlargement of crown radius R of the tread 2, the arrangement of many sipes on full surface 8a of the island part 8 of the shoulder portion 2a in the axial direction, and the like.

Among these proposals for the prevention of uneven wear, the increase of the rigidity in the island part 8 of the shoulder portion 2a is attained by increasing the width 7 in widthwise direction of the island part 8 of the shoulder portion 2a. In this case, the effect of preventing the shoulder wear is recognized to a certain extent, but when a lateral force applied to the tread end 2c wear becomes severer, the worn portion having a width $W_0$ and a stepwise difference $t_0$ or a so-called edging wear 9 (see FIG. 6) is produced in the tread end 2c, which undesirably progresses into the shoulder wear or wavy wear, so that the sufficient restraining effect is not obtained.

On the other hand, when the crown radius R of the tread 2 is made large in order to reduce the difference in the radius between the shoulder portion 2a and the central portion 2b in the tread 2, the dragging of the shoulder portion 2a of the tread 2 is prevented during the running to prevent the occurrence of uneven wear. In this case, however, the ground contact pressure in the central portion of the tread lowers to generate uneven wear in the central portion.

Moreover, when many sipes are arranged on the full surface of the island part of the shoulder portion in the tread in the axial direction, if the tire is used under severer use conditions, particularly a heavy load condition, a small block defined between the adjoining sipes is worn before and after the sipe in the rotational direction of the tire to cause a so-called heel and toe wear.

SUMMARY OF THE INVENTION

It is, therefore, an object of the invention to provide a heavy duty pneumatic radial tire having a specific tread form, particularly a specific form of both side regions of the tread which reduces the ground contact pressure and effectively prevent the occurrence of uneven wear even under severer use conditions by arranging a peripheral fine groove opening to the side face of the ground contact portion of the tread in a specific form at a specific region and further to provide a heavy duty pneumatic radial tire not causing troubles such as crack, tear and the like in the wall portion of the fine groove even when the running distance is largely increased.

According to a first aspect of the invention, there is the provision of a heavy duty pneumatic radial tire comprising a tread composed of a tread portion contacting with ground and provided with plural circumferential main grooves, characterized in that a fine groove having an opening of groove width corresponding to 5-75% of the width of said main groove and substantially continuously extending in the peripheral direction of the tire is arranged in at least one side face of said tread portion, and said fine groove starts from a position corresponding to 0-150% of the depth of said main groove located inward from an effective ground contact end of said tread portion along an outer profile of said side face in the radial direction and curvedly extends inward from said ground contact end in the axial direction to a position corresponding to 0.5-10% of a ground contact width of said tread and inward from said ground contact end in the radial direction to a position corresponding to 20-180% of the depth of said main groove.

According to a second aspect of the invention, there is the provision of a heavy duty pneumatic radial tire comprising a tread composed of a tread portion contacting with ground and provided with plural circumferential main grooves, characterized in that a fine groove having an opening of groove width corresponding to 5-75% of the width of said main groove and substantially continuously extending in the peripheral direction of the tire is arranged in at least one side face of said tread portion, and said fine groove starts from a position corresponding to 0-150% of the depth of said main groove located inward from an effective ground contact end of said tread portion along an outer profile of said side face in the radial direction and curvedly extends inward from said ground contact end in the axial direction to a position corresponding to 0.5-10% of a ground contact width of said tread and inward from said ground contact end in the radial direction to a position corresponding to 20-180% of the depth of said main groove, and a groove wall portion of said fine groove is covered with a rubber layer having excellent cracking resistance and ozone resistance at a thickness corresponding to a depth of at least 0.5 mm measured from the groove wall surface.

In the preferred embodiment of the first and second inventions, the fine groove has at least one bent portion.

The reason why the groove wall portion of the fine groove is covered with the rubber layer having a particular thickness is due to the fact that as the running distance of the heavy duty pneumatic radial tire according to the first invention largely increases, troubles such as ozone cracking, tearing or the like may be caused in the groove bottom and groove wall portion of the fine groove.

Further, it is preferable that the rubber layer is large in the content of antioxidant as compared with the tread rubber in the central portion of the tread.

The heavy duty pneumatic radial tires according to the first and second inventions are preferable to satisfy the following: that is, the fine groove has a groove depth corresponding to 20–150%, preferably 60–100% of the depth of the main groove. Further, the bent portion of the fine groove is preferable to be a dogleg-like form in section in the depthwise direction of the fine groove. Particularly, the bent portion of the fine groove has a dogleg-like form bending so as to focus each side of the fine groove into the central portion of the tire. Moreover, the fine groove consists of an upper groove portion and a lower groove portion connecting thereto through a bent portion, wherein the length of the upper groove portion is approximately equal to that of the lower groove portion.

The width of the opening in the fine groove is within a range of 5–75%, preferably 30–45%. When the opening width is less than 5%, the opposed groove wall portions of the fine groove contact with each other under a slight loading during the running and the reduction of ground contact pressure in the vicinity of the ground contact end is insufficient. When it exceeds 75%, the movement of outer blocks in the radial direction becomes too large as compared with the fine groove and the cracking or other trouble occurs in the inside of the fine groove.

The starting position of the fine groove is a position corresponding to 0–150%, preferably 25–65% of the depth of the main groove located inward from an effective ground contact end of the tread portion along an outer profile of the side face in the radial direction. When the starting position does not reach 0% or the starting position of the fine groove is a tread portion of the tread contacting with ground, a tear problem occurs. When it exceeds 150%, the effect of reducing the ground contact pressure at both side end parts of the tread portion is insufficient.

Further, the fine groove extends inward from the ground contact end in the axial direction to a position corresponding to 0.5–10%, preferably 1.0–5.0% of a ground contact width of the tread and inward from the ground contact end in the radial direction to a position corresponding to 20–180%, preferably 70–130% of the depth of the main groove. When the extending position is less than 0.5% inward in the axial direction, the reduction of the ground contact pressure at both side end parts of the tread portion is insufficient. When it exceeds 10%, the ground contact pressure of the tread shoulder portion lowers as a whole and the ground contact pressure of the ground contact end becomes relatively high. On the other hand, when the extending position of the fine groove is less than 20% inward in the radial direction, the reduction of the ground contact pressure at both side end parts of the tread portion is insufficient. When it exceeds 180%, the rigidity of the tread shoulder portion lowers and the troubles such as tear and the like occur.

The reason why the fine groove has at least one bent portion is based on the fact that the presence of the bent portion disperses strain concentrated in the bottom of the fine groove to prevent the occurrence of cracking and tearing in the groove bottom.

Further, the reason why the thickness of the rubber layer covering the groove wall face of the fine groove is limited to at least 0.5 mm from the groove wall surface is due to the fact that when it is less than 0.5 mm, the effect by the arrangement of the rubber layer is lost. Preferably, the thickness of the rubber layer is within a range of 0.5–5.0 mm. Since the rubber layer is applied to the side face of the tread portion of the tread, the upper limit of the thickness is 5.0 mm from viewpoints of the improvement of the processing and the suppression of the production cost.

In the heavy duty pneumatic radial tire of the first embodiment of this invention, the peripheral fine groove opening to the side face of the tread portion is arranged in the predetermined region at given groove width, groove depth and form, so that the rigidity and ground contact pressure at both side end parts of the tread portion lower. Therefore, the stress concentration in the ground contact end is prevented and also the premature occurrence of edging wear is restrained to prevent the occurrence of uneven wear at the ground contact end.

In the heavy duty pneumatic radial tire of the second embodiment of this invention, the fine groove as defined in the first invention is arranged in the tread portion of the tread and also the groove wall face of the fine groove is covered with the particular rubber layer having the specified thickness, so that even when the repetitive strain is applied to the groove wall face of the fine groove as the running distance of the tire increases, there is caused no ozone crack or tear trouble.

BRIEF DESCRIPTION OF THE DRAWINGS

The invention will be described with reference to the accompanying drawings, wherein:

FIG. 1 is a partially sectional view of a first embodiment of the heavy duty pneumatic radial tire according to the first embodiment of this invention;

FIG. 2 is an enlargedly sectional view of a main part of FIG. 1;

FIG. 3 is a partially sectional view of a second embodiment of the heavy duty pneumatic radial tire according to the first invention;

FIG. 4 is a partially sectional view of a third embodiment of the heavy duty pneumatic radial tire according to the invention;

FIG. 5 is an enlargedly sectional view of a main part of FIG. 4; and

FIG. 6 is a partially sectional view of the conventional tire.

DESCRIPTION OF THE PREFERRED EMBODIMENTS

In FIG. 1 is shown a first embodiment of the heavy duty pneumatic radial tire according to the invention, the construction of which will be described below.

In FIG. 1, numeral 11 is a heavy duty pneumatic radial tire having a tire size of 11R22.5 14PR, which is used on a rim of 8.25×22.5 under an internal pressure of 7.25 kg/cm$^2$. The tire 11 comprises a tread 12 having a tread portion 12a contacting with the ground, a belt 13 reinforcing the tread 12 and composed of plural belt layers containing steel cords therein, and a carcass 14 located inside the belt 13 and extending between a pair of bead cores. The tread portion 12a of the tread 12 is divided into five island portions 17 by four circumferential main grooves 16 in the axial direction of the tire. The effective ground contact width $W_{12}$ of the tread is 208 mm, and the width $W_{16}$ and depth $D_{16}$ of the main groove 16 are 13.5 mm and 14.7 mm, respectively.

The tread 12 has a fine groove 18 having an opening 18a at each side face 12b of the tread portion 12a in the axial direction thereof and substantially continuously extending in the peripheral direction thereof, a main part of which is enlargedly shown in FIG. 2. The width $W_{18}$ of the opening 18a in the fine groove 18 is 4.5 mm, which is 33.3% of the width $W_{16}$ of the main groove 16. The fine groove 18 starts from a position A of 4 mm i.e. a distance $L_A$ corresponding to 27.2% of the depth $D_{16}$ of the main groove 16 located inward from an effective ground contact end 20 of the tread portion 12a in the tread 12 along an outer profile of the side face 12b in the radial direction. Further, the fine groove 18 consists of an upper groove segment 18A, a bent segment 18B and a lower groove segment 18C in the section of the tire which extend inward in the axial direction and inward in the radial direction. The upper groove segment 18A and the lower groove segment 18C are bent in form of dogleg through the bent segment 18B. Moreover, the acute angle $\theta_1$ between a center line $N_{18A}$ of the upper groove segment 18A and a line I perpendicular to the rotating axis of the tire is 60°, while the acute angle $\theta_2$ between a center line $N_{18C}$ of the lower groove segment 18C and the line I perpendicular to the rotating axis of the tire is $-15°$ (provided that the outside of the line I in the axial direction is + and the inside of the line I in the axial direction is −). The angle of the bent segment 18B with respect to the line I gradually changes with the curvature of center line $N_{18B}$ thereof.

In this case, it is preferable that the angle $\theta_1$ is relatively large and the angle $\theta_2$ is relatively small. Particularly, the angle $\theta_1$ is within a range of 0°–140°, preferably 35°–80°, while the angle $\theta_2$ is within a range of $+90° \sim -90°$, preferably $-20° \sim +40°$.

The fine groove 18 starts from the position A and extends to a position of 5.5 mm or a distance B corresponding to 2.6% of the effective ground contact width $W_{12}$ of the tread 12 located inward from the effective ground contact end 20 in the axial direction and to a position of 14.7 mm or a distance C corresponding to 100% of the depth $D_{16}$ of the main groove 16 located inward from the effective ground contact end 20 in the radial direction.

The width $W_{18}$ of the fine groove 18 gradually reduces from the opening width of 4.5 mm as the depth of the fine groove becomes deeper, and the minimum width $W_{18M}$ of the fine groove 18 is 2.0 mm above a bottom 18D thereof. The groove bottom 18D takes a flask form considering cracking or the like as illustrated in FIGS. 1 and 2 the groove bottom 18D has a width greater than that of the lower groove segment 18C.

The depth $D_{18}$ of the fine groove 18 is a length extending from the opening to the groove bottom 18D along center lines $N_{18A}$ to $N_{18C}$ of the fine groove 18, which is 13.5 mm and corresponds to 92% of the depth $D_{16}$ of the main groove 16. Furthermore, the length of the upper groove segment 18A in the fine groove 18 is approximately equal to that of the lower groove segment 18C.

As shown in FIG. 1, a concave portion 22 extending peripherally of the tire may be arranged in the side face 12b of the tread 12 inward from the fine groove 18 in the radial direction.

In the illustrated tire, the fine groove 18 is arranged in each side end part 12c of the tread portion 12a during the running, so that the ground contact pressure at both side end parts is reduced to prevent the stress concentration in the ground contact end 20 and suppress the occurrence of uneven wear.

In FIG. 3 is shown a second embodiment of the heavy duty pneumatic radial tire according to the first invention, which has the same construction as in the first embodiment except for the following point.

That is, in the tire 31, the fine groove 18 consists of the upper groove segment 18A and the lower groove segment 18C curvedly extending inward in the axial and radial directions so that the angle $\theta_1$ between the center line $N_{18A}$ of the upper groove Segment 18A and the line I perpendicular to the rotating axis ($+60°$) and the angle $\theta_2$ between the center line $N_{18C}$ of the lower groove segment 18C and the line I ($+18°$ C.) are outside of the line I in the axial direction.

In FIGS. 4 and 5 is shown a third embodiment of the heavy duty pneumatic radial tire according to the invention, which has the same construction as in the second embodiment except for the following point.

That is, in the tire 41, the groove wall portion 18F at the groove bottom 18D and the side wall 18E of the fine groove 18 is composed of a rubber layer 43 having a thickness $D_{43}$ of 2 mm as measured from the groove wall surface. As shown in FIGS. 4 and 5, the side face 12c of the tread portion 12a is also covered with the rubber layer 43, which is due to the restriction in the formation of the rubber layer. The rubber layer 43 contains an antioxidant for ozone resistance, an amount of which is larger than that contained in the central portion of the tread 12.

In the illustrated tire 41, the groove wall portion 18F of the fine groove 18 is covered with the rubber layer 43, so that even when the groove bottom 18D and side wall 18E of the fine groove 18 are repeatedly subjected to bending as the running distance increases, there is caused no cracking through ozone, nor cracking and tear troubles due to bending fatigue.

The effect of the invention will be described by using the following four test tires (Test Examples 1–3 and Comparative Example).

The tire used in Test Example 1 was the same as shown in FIG. 1, and the tire used in Test Example 2 was the same as shown in FIG. 3, and the tire used in Test Example 3 was the same as shown in FIG. 4, while the tire used in Comparative Example was a tire having no fine groove 18 and concave portion 22, which corresponded to the conventional tire shown in FIG. 6.

Each of these tires was mounted on a normal rim and inflated under a normal internal pressure, which was then mounted on a test vehicle and run on general road under a normal load over a distance of 200,000 km. In this case, the occurrence state of uneven wear in the tread and the occurrence state of crack or tear trouble on the surface of the fine groove were observed after the running over a distance of 100,000 km or 200,000 km. Moreover, the occurrence state of uneven wear was evaluated by measuring the edging wear produced at the tread end as a width $W_0$ and a stepwise difference $t_0$ of the uneven wear as shown in FIG. 6.

The measured results are shown in the following Table 1, wherein the upper part of Table 1 shows the results after the running over a distance of 100,000 km and the lower part thereof shows the results after the running over a distance of 200,000 km.

TABLE 1

|  |  |  | Comparative Example Conventional tire | Test Example 1 First embodiment of FIG. 1 | Test Example 2 Second embodiment of FIG. 3 | Test Example 3 Third embodiment of FIG. 4 |
| --- | --- | --- | --- | --- | --- | --- |
| After running over 100,000 km | Amount of uneven wear generated | width $W_0$ (mm) | 1.0~3.5 | zero (no edging) | zero (no edging) | zero (no edging) |
|  |  | stepwise difference $t_0$ (mm) | 2~3 | zero (no stepwise difference) | zero (no stepwise difference) | zero (no stepwise difference) |
|  | Trouble on surface of fine groove |  | — | none | none | none |
| After running over 200,000 km | Amount of uneven wear generated | width $W_0$ (mm) | 1.8~4.2 | zero (no edging) | zero (no edging) | zero (no edging) |
|  |  | stepwise difference $t_0$ (mm) | 5~6 | zero (no stepwise difference) | zero (no stepwise difference) | zero (no stepwise difference) |
|  | Trouble on surface of fine groove |  | — | presence | presence | none |

As shown in Table 1, in the measurement after the running over 100,000 km, the uneven wear was generated at a width $W_0$ of 1.0–3.0 mm and a stepwise difference $t_0$ of 2–3 mm in the tire of Comparative Example, while no uneven wear was generated in the tires of Test Examples 1–3 (each of the width $W_0$ and stepwise difference $t_0$ was zero). Further, the crack or tear trouble on the surface of the fine groove was not observed in the tires of Test Examples 1–3. On the other hand, in the measurement after the running over 200,000 km, the uneven wear in the tire of Comparative Example had a width $W_0$ of 1.8–4.2 mm and a stepwise difference to of 5–6 mm, while the occurrence of uneven wear was not observed in the tires of Test Examples 1–3. Moreover, the crack or tear trouble on the surface of the fine groove was observed in the tires of Test Examples 1 and 2, but it was not observed in the tire of Test Example 3.

As mentioned above, according to first invention, the peripheral fine groove opening to the side face of the tread portion in the tread is arranged on the particular region of the side face in a particular form, so that the ground contact pressure is reduced at the tread end part and the occurrence of uneven wear at both end parts of the tread can effectively be prevented even under severer use conditions.

Further, according to the invention, even when the running distance is increased, the occurrence of ozone cracking and tear troubles on the surface of the fine groove can be prevented in addition to the effect of the first invention.

What is claimed is:

1. A heavy duty pneumatic radial tire comprising; a tread composed of a tread portion contacting with ground and provided with plural circumferential main grooves, a fine groove having an opening of groove width corresponding to 5–75% of the width of one of said main grooves and substantially continuously extending in the peripehral direction of the tire is arranged in at least one side face of said tread portion, and said fine groove in cross-section having a first segment and a second segment bent inwardly from said first segment such that centerlines of said first and second segments form different angles relative to a circumferential plane of said tire, said fine groove starting from a position corresponding to 0–150% of the depth of said main groove which is located inward from an effective ground contact end of said tread portion along an outer profile of said side face in the radial direction, and is bent inward from said ground contact end of said tread in the axial direction to a position corresponding to 0.5–10% of a ground contact width of said tread and inward from said ground contact end of said tread in the radial direction to a position corresponding to 20–180% of the depth of said main groove.

2. The heavy duty pneumatic radial tire according to claim 1, wherein said second segment of said fine groove has at least one curved portion.

3. A heavy duty pneumatic radial tire of claim 1, wherein a groove wall portion of said fine groove is covered with a rubber layer having excellent cracking resistance and ozone resistance at a thickness corresponding to a depth of at least 0.5 mm measured from the groove wall surface.

4. The heavy duty pneumatic tire according to claim 1 wherein said fine groove further comprises a groove bottom, said groove bottom having a width larger than that of said second segment.

5. The heavy duty pneumatic tire of claim 1 wherein a center line of said fine groove defines two angles relative to a circumferential plane of said tire a first angle $\theta_1$ relative to said centerline in said first segment being a positive angle in the axial direction and a second angle $\theta_2$ relative said centerline in said second segment being a negative angle in the axial direction.

6. The heavy duty pneumatic tire of claim 5 wherein $\theta_1$ is no greater than 140° and $\theta_2$ is no smaller than −90°.

7. The heavy duty pneumatic tire of claim 1 wherein a centerline of said fine groove defines two angles relative to a circumferential plane of said tire, a first angle $\theta_1$ relative to said centerline in said first segment being a positive angle in the axial direction and a second angle $\theta_2$ relative to said centerline in said second segment being a positive angle in the axial direction.

8. The heavy duty pneumatic tire of claim 7 wherein $\theta_1$ is no greater than 140° and $\theta_2$ is no greater than 90°.

9. The heavy duty pneumatic tire of claim 1 wherein a centerline of said fine groove has a dog-leg bend.

10. A radial tire comprising; a tread portion having a ground contact portion with main grooves, a tread portion side face not in ground contact, a fine groove opening in said tread portion side face and extending in the peripheral direction of said tire, said fine groove in cross-section having a first segment directed inward from said tread portion side face and a second segment bent at an angle from said first segment such that centerlines of said first and second segments form to different angles relative to a circumferential plane of said tire.

11. A radial tire according to claim 10 wherein said fine groove has an opening width corresponding to 5–75% of a width of one of said main grooves.

12. A radial tire according to claim 10 wherein said fine groove starts on said side face from a position corresponding to 0–150% of a depth of said main groove and is bent inward to a position corresponding to 0.5–10% of a ground contact width of said tread and inward to a position corresponding to 20–180% of a depth of said main groove.

13. A radial tire according to claim 10 wherein said fine groove further comprises a groove bottom having a width larger than that of said second segment.

14. The radial tire according to claim 10 wherein said centerline of said first segment defines a positive angle $\theta_1$ in the axial direction relative to a circumferential plane of said tire and said centerline of said second segment defines a negative angle $\theta_2$ in the axial direction relative to a circumferential plane of said tire.

15. The radial tire according to claim 10 wherein $\theta_1$ is no greater than 140° and $\theta_2$ is no smaller than −90°.

16. The radial tire according to claim 10 wherein said centerline of said first segment defines a positive angle $\theta_1$ in the axial direction relative to a circumferential plane of said tire and said centerline of said second segment defines a positive angle $\theta_2$ in the axial direction relative to a circumferential plane of said tire.

17. The radial tire according to claim 16 wherein $\theta_1$ is no greater than 140° and $\theta_2$ is no greater than 90°.

18. The radial tire according to claim 10 wherein said fine groove is a dog-leg bend.

* * * * *